United States Patent [19]
Chang et al.

[11] Patent Number: 5,642,332
[45] Date of Patent: Jun. 24, 1997

[54] ACOUSTIC TRANSDUCER

[75] Inventors: Win H. Chang, Houston; Algernon S. Badger, E. Bernard; Bernard Simensky, Houston, all of Tex.

[73] Assignee: I/O Exploration Products (U.S.A.), Inc., Stafford, Tex.

[21] Appl. No.: 537,972

[22] Filed: Oct. 2, 1995

[51] Int. Cl.$^6$ .......................... H04R 17/00; H01L 41/08
[52] U.S. Cl. ........................ 367/165; 367/173; 310/344; 310/337
[58] Field of Search ..................... 310/344, 348, 310/324, 337; 367/157, 163, 165, 173, 174, 141, 159

[56] References Cited

U.S. PATENT DOCUMENTS

| | | | |
|---|---|---|---|
| 3,187,300 | 6/1965 | Brate | 367/160 |
| 3,832,762 | 9/1974 | Johnston et al. | 29/25.35 |
| 3,970,878 | 7/1976 | Berglund | 310/337 |
| 4,004,266 | 1/1977 | Cook et al. | 367/155 |
| 4,431,937 | 2/1984 | White | 310/344 |
| 4,999,819 | 3/1991 | Newnham et al. | 367/157 |
| 5,276,657 | 1/1994 | Newnham et al. | 367/157 |

*Primary Examiner*—Ian J. Lobo
*Attorney, Agent, or Firm*—Tim Headley; Haynes and Boone, L.L.P.

[57] ABSTRACT

An acoustic transducer assembly includes a piezoelectric ceramic crystal. The assembly also includes a pair of solid circular metal plates positioned to sandwich the piezoelectric ceramic crystal between them, wherein each of the metal plates comprises: (i) an outer rim circling a concave portion formed in a first surface of the metal plate, the first surface oriented toward the piezoelectric ceramic crystal; and (ii) an epoxy wicking barrier formed in the first surface, adjacent to the outer rim. The assembly also includes an epoxy adhesive interposed between the metal plates and the piezoelectric ceramic crystal, wherein the outer rim of each plate is bonded to the piezoelectric ceramic crystal by the epoxy adhesive, the pair of plates thus forming a cavity between them. The assembly also includes a flexing stop attached to each first surface.

11 Claims, 4 Drawing Sheets

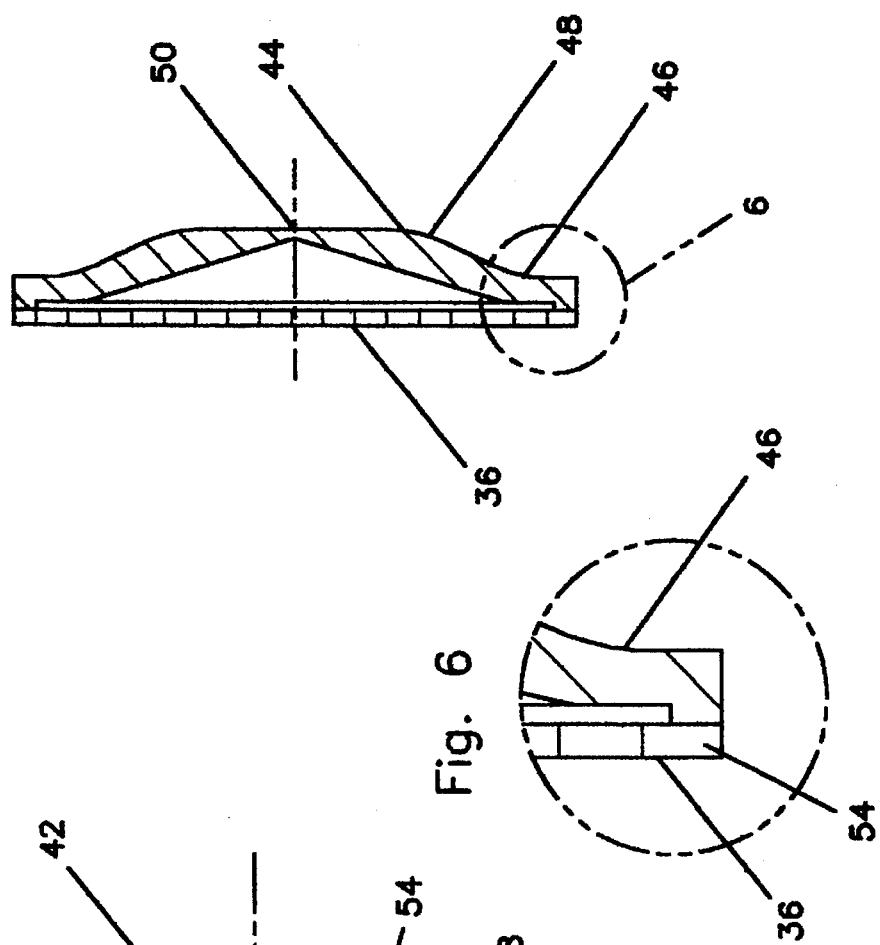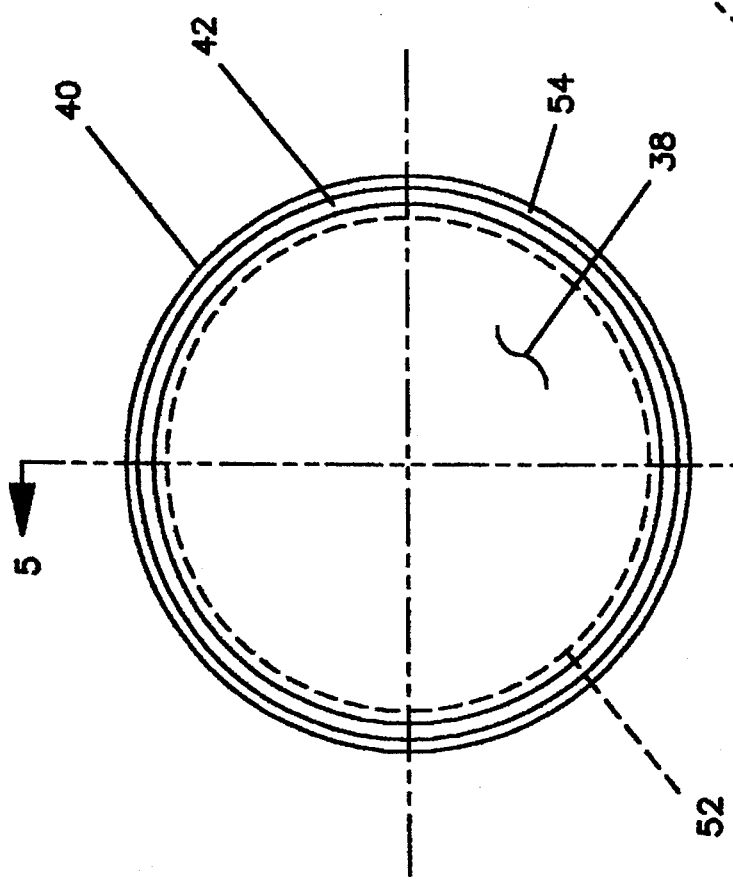

5,642,332

ACOUSTIC TRANSDUCER

FIELD OF THE INVENTION

This invention relates to acoustic transducers and, more particularly, to a hydrophone for use in a seismic streamer cable at depths down to 300 meters.

BACKGROUND OF THE INVENTION

U.S. Pat. Nos. 3,187,300 to Brate and 3,832,762 to Johnson et al. disclose hydrophones having component-to-component seals of epoxy.

U.S. Pat. No. 3,970,878 discloses an acoustic transducer which has no plastic or epoxy parts exposed to the outside of the transducer unit, to avoid electrical leakage caused by the epoxy or plastic absorbing salt from exposure to salt water. However, the disclosed transducer appears, from the patent, and from the technical specifications of the commercial embodiment, to be limited to depths of less than one hundred and fifty feet.

U.S. Pat. No. 4,999,819 discloses an acoustic transducer for use in "deep submergence applications under high hydrostatic pressures." Col. 2, lines 31–32. However, because it is designed for high hydrostatic pressures, it is not as sensitive as desired for shallower water, where streamer cables are usually used. What is needed is a transducer with greater sensitivity, for more accurate readings.

The construction of this transducer also requires, after assembly, curing for ten minutes at 600 degrees centigrade. As a result of such heat, if the piezoelectric cell had been poled before assembly, it then has to be repoled. Piezoelectric cells may be purchased already poled, so it is a waste of time and money to repole them. What is needed is a transducer that does not require a curing which destroys the original poling.

Furthermore, after the repoling, the transducer then has to be stored for at least ten days, to let the piezoelectric cell age, before calibrating the transducer. Because the aging is not linear, most of the aging occurs within the first ten days. The required storage time increases manufacturing time, and increases storage costs. What is needed is a transducer that does not require an aging period after assembly.

SUMMARY OF THE INVENTION

The foregoing problems are solved and a technical advance is achieved by the provision of an acoustic transducer assembly which includes: (a) a piezoelectric ceramic crystal; (b) a pair of solid circular metal plates positioned to sandwich the piezoelectric ceramic crystal between them, wherein each of the metal plates comprises: (i) an outer rim circling a concave portion formed in a first surface of the metal plate, the first surface oriented toward the piezoelectric ceramic crystal; and (ii) an epoxy wicking barrier formed in the first surface, adjacent to the outer rim; (c) an epoxy adhesive interposed between the metal plates and the piezoelectric ceramic crystal, wherein the outer rim of each plate is bonded to the piezoelectric ceramic crystal by the epoxy adhesive, the pair of plates thus forming a cavity between them; and (d) a flexing stop attached to each first surface.

In another feature of the invention, the epoxy wicking barrier comprises a recessed inner rim.

In another feature of the invention, the epoxy wicking barrier comprises masking tape attached to an inner edge of the outer rim.

In another feature of the invention, the flexing stop comprises the piezoelectric ceramic crystal.

In another feature of the invention, the flexing stop comprises a pedestal rim attached to each of the first surfaces, midway between the center of the first surface and the outer rim.

In another feature of the invention, a hydrophone includes the acoustic transducer assembly, and further comprises: (a) a leader wire attached to a second surface of each metal plate, the second surface being opposite the first surface, and having a convex portion formed in it; (b) a case housing the pair of metal plates with the attached leader wires; and (c) a potting sealant surrounding the pair of metal plates and leader wires, and filling substantially all the space in the case not occupied by the pair of metal plates and leader wires.

BRIEF DESCRIPTION OF THE DRAWINGS

The above-noted and other aspects of the present invention will become more apparent from a description of the preferred embodiment when read in conjunction with the accompanying drawings. The drawings illustrate the preferred embodiment of the invention. In the drawings the same members have the same reference numerals.

FIG. 4 is a plan view of a solid circular metal plate, which comprises part of an acoustic transducer.

FIG. 5 is a side view of the metal plate of FIG. 4, taken along the line 5—5 of FIG. 4.

FIG. 6 is an enlarged view of a portion of FIG. 5.

DETAILED DESCRIPTION OF THE PREFERRED EMBODIMENT

Figure 1:
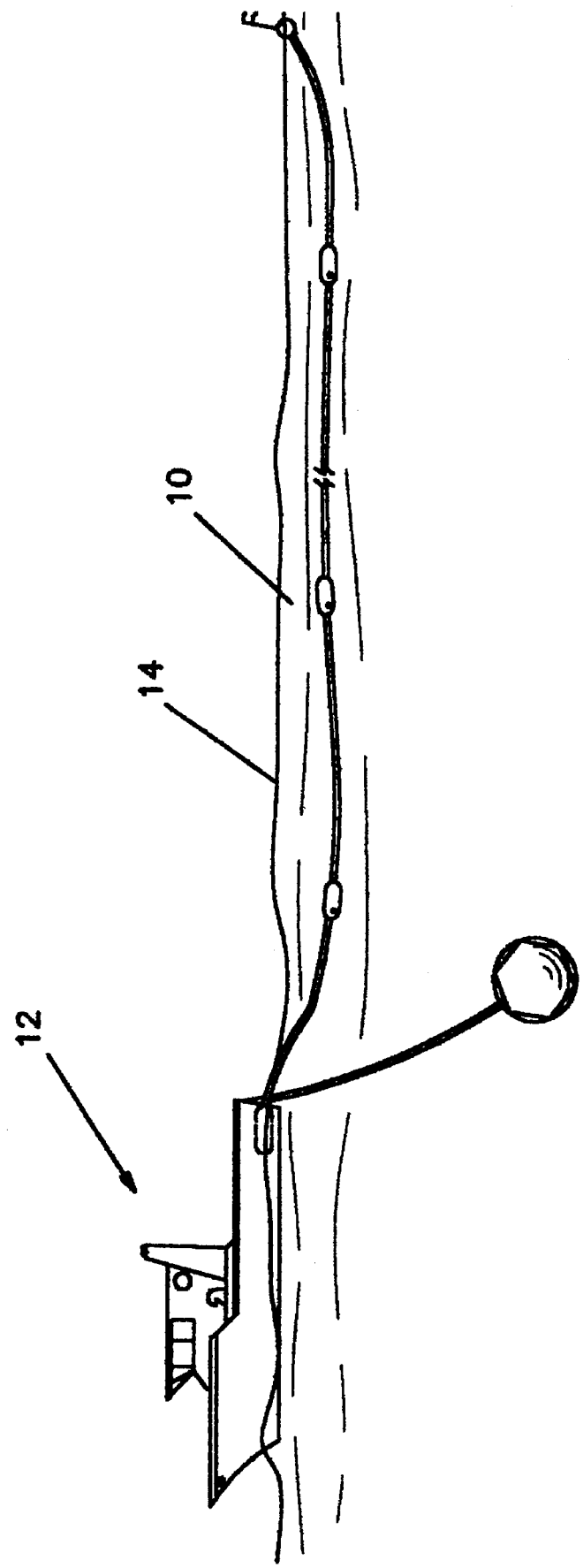
FIG. 1 is a general overall view of an illustrative seismic streamer cable towed behind a boat, the cable containing many hydrophones.

FIG. 1 depicts a seismic streamer cable 10 towed behind a boat 12. The cable 10 contains hydrophones 14.

Figure 2:
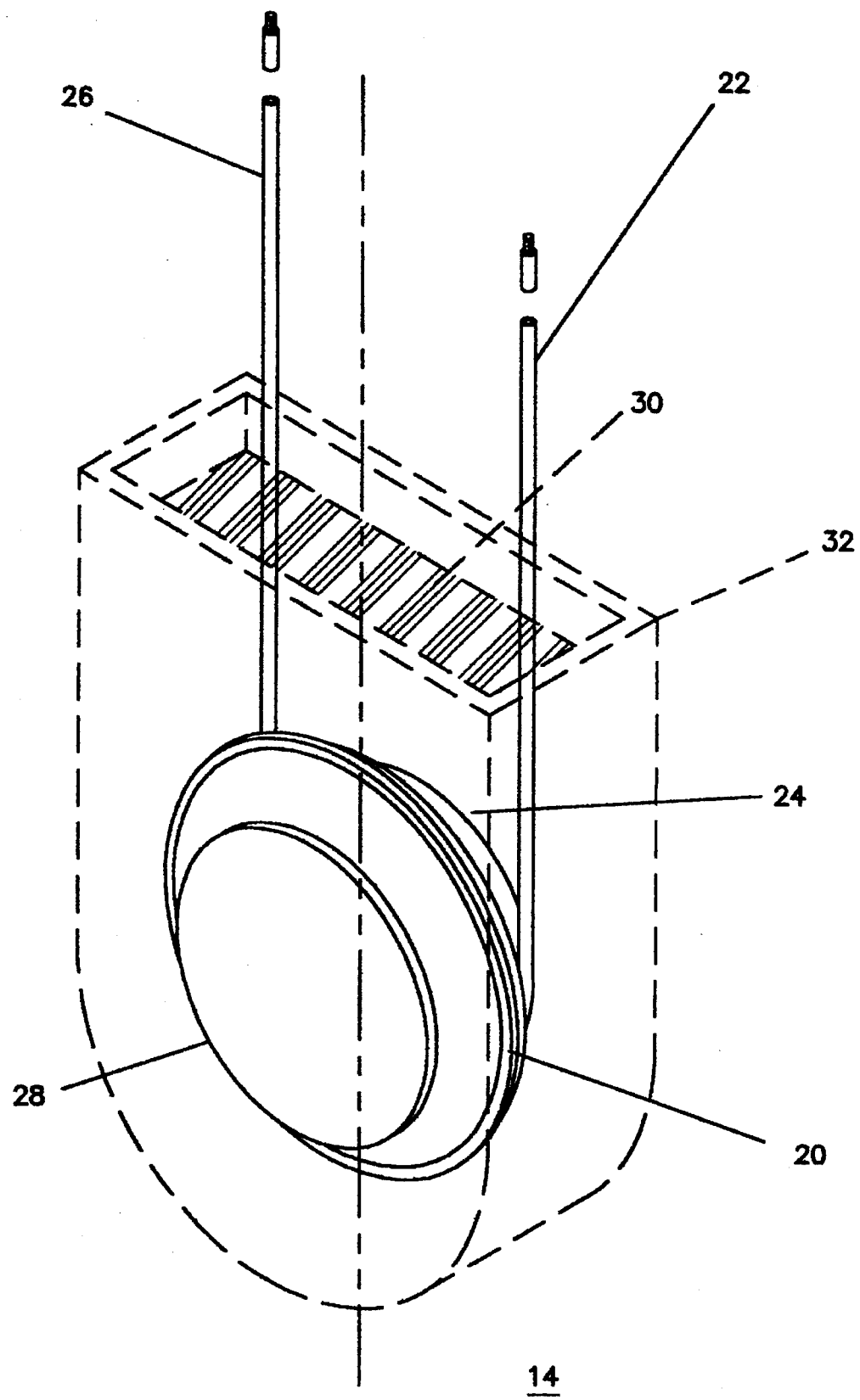
FIG. 2 is a perspective view of a hydrophone, containing an acoustic transducer.

FIG. 2 is a perspective view of a hydrophone 14, containing an acoustic transducer 20. The transducer 20 has a leader wire 22 attached to a metal plate 24, and a leader wire 26 attached to a metal plate 28. The transducer 20 is surrounded by polyurethane 30, filling a boot 32. The polyurethane 30 must be, as much as possible, acoustically transparent. This is done by selecting a polyurethane which has, as much as possible, the same acoustic characteristics as sea water, or as the Isopar H, manufactured by Exxon, in which the hydrophone is immersed inside the marine seismic streamer cable 10. Similarly, the boot 32 must be, as much as possible, acoustically transparent. The boot 32 is made of a thin, soft, flexible vinyl.

The polyurethane 30 is model no. HMP-85, manufactured by Fluid Polymers, in Las Vegas, Nev., which is a division of Chase Corp. in Pittsburgh, Pa. The boot 32 is a boot manufactured by Mocap Inc. in St. Louis, Mo.

Figure 3B:
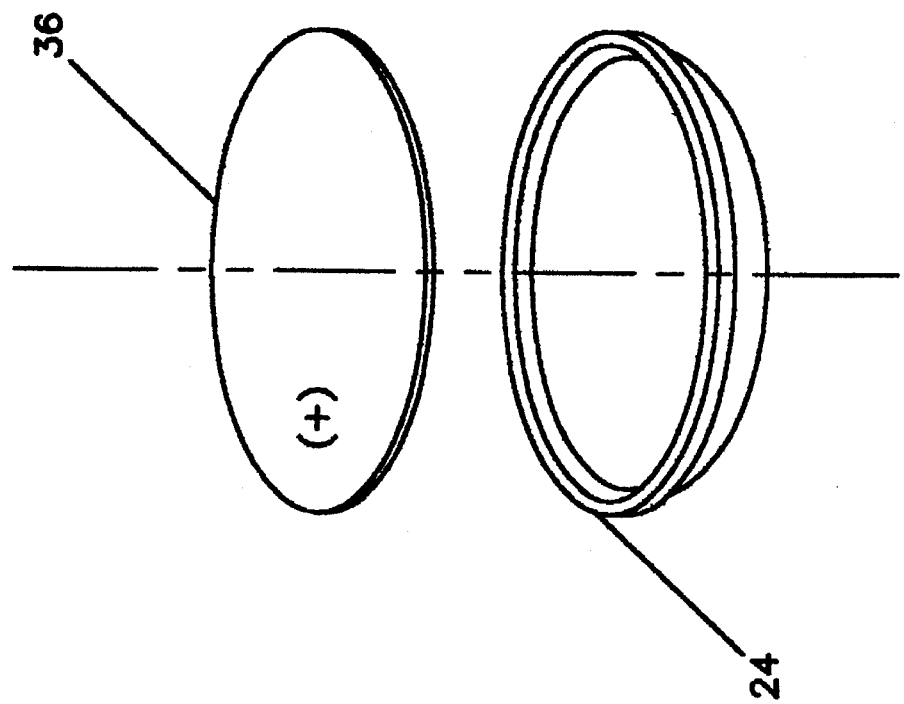
FIG. 3b is an exploded view of one metal plate and a piezoelectric ceramic crystal.
Figure 3A:
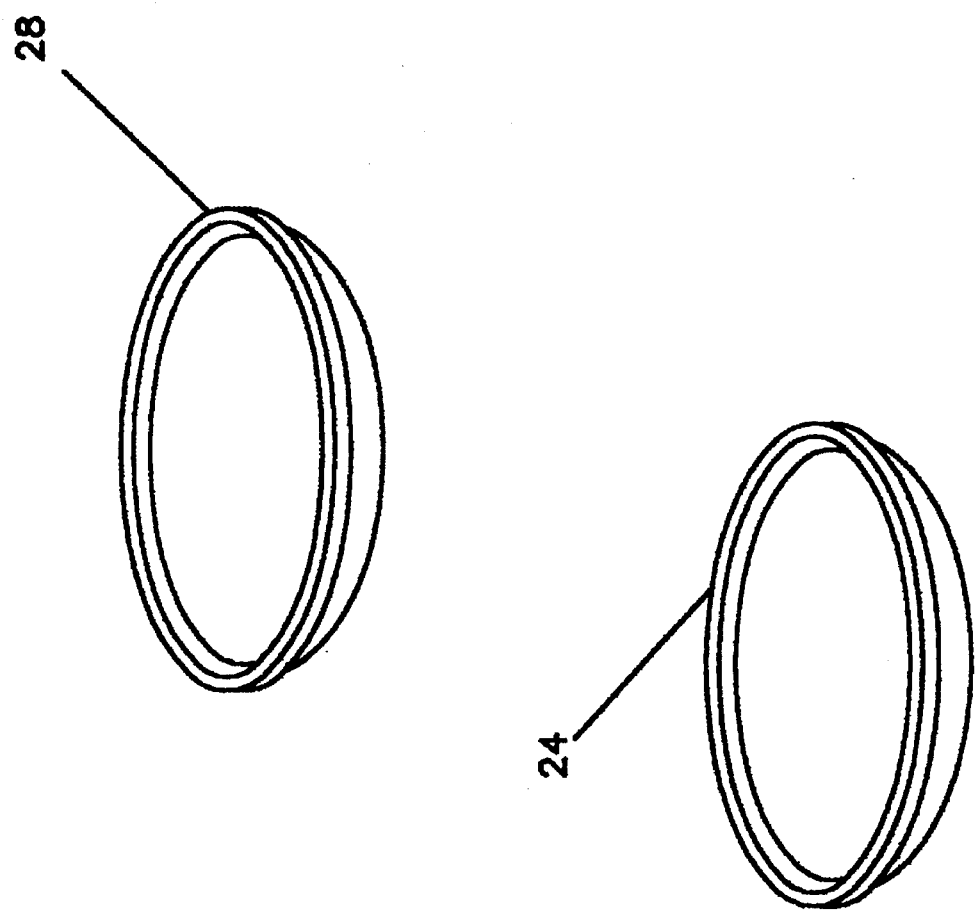
FIG. 3a is a perspective view of the two metal plates of an acoustic transducer.

FIG. 3a is a perspective view of the two metal plates 24, 28 of the acoustic transducer 20. The two plates are identical. Each has a diameter less than one inch, and is slightly concave. FIG. 3b is an exploded view of the metal plate 24 and a piezoelectric ceramic crystal 36.

FIG. 4 is a plan view of a concave side 38 of the solid circular metal plate 24. The plate 24 includes an outer rim 40 and a recessed inner rim 42. The diameter of the piezoelectric ceramic crystal 36 is less than the diameter of the plate 24, but is greater than the diameter of the recessed inner rim 42. The two plates 24, 28 are put together with their concave sides 38 facing each other, the piezoelectric ceramic crystal 36 between them, and an epoxy adhesive 54 is interposed between the metal plates 24, 28 and the piezoelectric ceramic crystal 36. The outer rim 40 of each plate is bonded to the piezoelectric ceramic crystal 36 by the epoxy adhesive 54, the pair of plates thus forming a cavity between them. The epoxy adhesive 54, with a conductive filler, is Ecobond, made by Emerson & Cuming, in Woburn, Mass.

The recessed inner rim 42 acts as a wicking barrier, so that when the epoxy adhesive is placed on the plates 24, 28, it does not "wick" further along from the outer rim 40 towards the center of the piezoelectric ceramic crystal 36 and the plates 24, 28. Another less effective form of a wicking barrier would be to put masking tape along the inner perimeter of the outer rim 40.

FIG. 5 is a side sectional view of the metal plate 24, taken along the line 5—5 of FIG. 4. Proceeding from the recessed inner rim 42 towards the center of the plate, the plate thickens and then thins to be thinner at the center than at either of the rims 40, 42. Also depicted in FIG. 5 is the crystal 36, glued to the outer rim 40. The crystal 36 is a little more than twice as thick as the depth of the recessed inner rim 42. A convex side 44 of the plate 24 includes a small radius curve 46 and a large radius curve 48. In operation, as pressure increases on the outside of the hydrophone 14, a center 50 of the convex side 44 is pushed inwardly. The crystal 36 acts as a flexing stop to stop the inward movement of the center 50. To achieve less flexing, a flexing stop could also be achieved by a pedestal rim attached to each of the concave sides 38, midway between the center 50 and the outer rim 40. Still another flexing stop could be achieved by a small pedestal attached at the center 50.

Referring to both FIG. 4 and FIG. 5, the inner dotted circle 52 shown in FIG. 4 is where the small radius curve 46 meets the outer rim 40 on the convex side 44.

FIG. 6 is an enlarged view of a portion of FIG. 5, at the point of the juncture of the crystal 36 and the rims 40, 42. The width of the recessed inner rim 42 is greater than the width of the outer rim 40.

The hydrophone 14 is made in the following steps. First, the previously polarized piezoelectric crystal 36 is positioned to be sandwiched between the pair of solid circular metal plates 24, 28. The epoxy adhesive 54 is then applied to the outer rims 40 of the plates. The plates 24, 28 and the crystal 36 are then put together, with the crystal sandwiched between them, and the plates are held together by a clamp while the epoxy adhesive 54 cures, thus forming the acoustic transducer assembly 20.

The acoustic transducer assembly 20 is cured at temperatures less than 150 degrees centigrade. In the preferred method, the curing temperature is 65 degrees centigrade, about one hundred forty-me degrees fahrenheit. This low temperature curing, as opposed to the high temperatures required to cure an assembly made with solder, avoids the prior art problem of destroying the polarization of the piezoelectric ceramic crystal 36. The curing temperature can be varied according to the manufacturer's specifications. For example, it could be cured at 95 degrees centigrade for one hour, or at room temperature for twenty-four hours. Different manufacturers of the epoxy adhesive 54 would have different curing temperatures and times.

After the acoustic transducer assembly 20 has been cured, it is encapsulated in the flexible case, or boot 32, with the polyurethane potting sealant 30 to form a potted assembly 20. Finally, the potted assembly 20 is cured at temperatures less than 150 degrees centigrade to form the hydrophone 14.

Although an illustrative embodiment of the invention has been shown and described, other modifications, changes and substitutions are intended in the foregoing disclosure. Accordingly, it is appropriate that the appended claims be construed broadly and consistent with the scope of the invention.

What is claimed is:

1. An acoustic transducer assembly comprising:
   a. a piezoelectric ceramic crystal;
   b. a pair of solid circular metal plates positioned to sandwich the piezoelectric ceramic crystal between them, wherein each of the metal plates comprises:
      i. an outer rim circling a concave portion formed in a first surface of the metal plate, the first surface oriented toward the piezoelectric ceramic crystal; and
      ii. an epoxy wicking barrier formed in the first surface, adjacent to the outer rim; and
   c. a conductive epoxy adhesive interposed between the metal plates and the piezoelectric ceramic crystal, wherein the outer rim of each plate is bonded to the piezoelectric ceramic crystal by the epoxy adhesive, the pair of plates thus forming a cavity between them; and
   d. a flexing stop attached to each first surface.

2. The acoustic transducer assembly of claim 1, wherein the epoxy wicking barrier comprises a recessed inner rim.

3. The acoustic transducer assembly of claim 1, wherein the epoxy wicking barrier comprises masking tape attached to an inner edge of the outer rim.

4. The acoustic transducer assembly of claim 1, wherein the flexing stop comprises the piezoelectric ceramic crystal.

5. The acoustic transducer assembly of claim 1, wherein the flexing stop comprises a pedestal rim attached to each of the first surfaces, midway between the center of the first surface and the outer rim.

6. The acoustic transducer assembly of claim 1, further comprising:
   a. a leader wire attached to a second surface of each metal plate, the second surface being opposite the first surface, and having a convex portion formed in it;
   b. a case housing the pair of metal plates with the attached leader wires; and
   c. a potting sealant surrounding the pair of metal plates and leader wires, and filling substantially all the space in the case not occupied by the pair of metal plates and leader wires.

7. The acoustic transducer assembly of claim 6, wherein the potting sealant is polyurethane.

8. The acoustic transducer assembly of claim 2, wherein the flexing stop comprises the piezoelectric ceramic crystal.

9. The acoustic transducer assembly of claim 2, wherein the flexing stop comprises a pedestal rim attached to each of the first surfaces, midway between the center of the first surface and the outer rim.

10. A hydrophone comprising:
    a. a piezoelectric ceramic crystal;
    b. a pair of solid circular metal plates positioned to sandwich the piezoelectric ceramic crystal between them, wherein each of the metal plates comprises:
       i. an outer rim circling a concave portion formed in a first surface of the metal plate, the first surface oriented toward the piezoelectric ceramic crystal; and ii. an epoxy wicking barrier formed in the first surface, adjacent to the outer rim; and c. an epoxy adhesive interposed between the metal plates and the piezoelectric ceramic crystal, wherein the outer rim of each plate is bonded to the piezoelectric ceramic crystal by the epoxy adhesive, the pair of plates thus forming a cavity between them;

d. a flexing stop attached to each first surface;

e. a leader wire attached to a second surface of each metal plate, the second surface being opposite the first surface, and having a convex portion formed in it;

f. a case housing the pair of metal plates with the attached leader wires; and g. a potting sealant surrounding the pair of metal plates and leader wires, and filling substantially all the space in the case not occupied by the pair of metal plates and leader wires.

11. The hydrophone of claim 10, wherein a. the epoxy wicking barrier comprises a recessed inner rim;

b. the flexing stop comprises the piezoelectric ceramic crystal; and c. the potting sealant is polyurethane.

* * * * *

UNITED STATES PATENT AND TRADEMARK OFFICE
CERTIFICATE OF CORRECTION

PATENT NO. : 5,642,332
DATED : June 24, 1997
INVENTOR(S) : Win H. Chang et al.

It is certified that error appears in the above-indentified patent and that said Letters Patent is hereby corrected as shown below:

Column 3, line 56, "forty-me" should read --forty-nine--.

Signed and Sealed this

Fourteenth Day of October, 1997

Attest:

BRUCE LEHMAN

Attesting Officer     Commissioner of Patents and Trademarks